US006634808B2

(12) United States Patent
Glingener

(10) Patent No.: US 6,634,808 B2
(45) Date of Patent: Oct. 21, 2003

(54) METHOD FOR TRANSMITTING AT LEAST ONE FIRST AND ONE SECOND DATA SIGNAL IN POLARIZATION DIVISION MULTIPLEX IN AN OPTICAL TRANSMISSION SYSTEM

(75) Inventor: Christoph Glingener, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/262,331

(22) Filed: Sep. 30, 2002

(65) Prior Publication Data

US 2003/0090760 A1 May 15, 2003

(30) Foreign Application Priority Data

Sep. 28, 2001 (DE) .......................................... 101 47 892

(51) Int. Cl.[7] ................................................ H04J 14/06
(52) U.S. Cl. ......................... 398/65; 398/152; 398/184; 398/205
(58) Field of Search ........................... 398/65, 152, 184, 398/205

(56) References Cited

U.S. PATENT DOCUMENTS

| | | | | |
|---|---|---|---|---|
| 5,111,322 A | * | 5/1992 | Bergano et al. | ................ 398/74 |
| 5,257,126 A | * | 10/1993 | Calvani et al. | ............. 398/184 |
| 5,329,394 A | * | 7/1994 | Calvani et al. | ............. 398/152 |
| 5,491,576 A | * | 2/1996 | Bergano | ..................... 398/185 |
| 2002/0003641 A1 | * | 1/2002 | Hall et al. | ................... 359/122 |

FOREIGN PATENT DOCUMENTS

WO        WO 01/65754        9/2001

OTHER PUBLICATIONS

IEEE Photonics Technology Letters, vol. 4, No. 5, May 1992—"Fast Automatic Polarization Control System" Heismann et al.
IEEE Photonics Technology Letters, vol. 4, No. 4, May 1992—Optical Polarization Division Multiplexing at 4 Gb/s, Hill et al.

* cited by examiner

Primary Examiner—Kinfe-Michael Negash
(74) Attorney, Agent, or Firm—Bell Boyd & Lloyd LLC

(57) ABSTRACT

In an optical transmission system, a first modulated signal is generated at the transmitting end by modulating a first carrier signal with a first data signal and a second modulated signal is generated by modulating a second carrier signal, which differs from the first carrier signal by a differential frequency, with a second data signal. The first and second modulated signals are polarized orthogonally with respect to one another and combined to form an optical multiplex signal and are transmitted. At the receiving end, the optical multiplex signal is conducted via a polarization control element to a polarization splitter which splits the optical multiplex signal into the first and second modulated signals. The first modulated signal is converted into a first electrical signal and the second modulated signal is converted into a second electrical signal, the spectral component of the first and/or of the second electrical signal at the differential frequency is determined and from this at least one control signal is derived for controlling the polarization control element.

10 Claims, 2 Drawing Sheets

METHOD FOR TRANSMITTING AT LEAST ONE FIRST AND ONE SECOND DATA SIGNAL IN POLARIZATION DIVISION MULTIPLEX IN AN OPTICAL TRANSMISSION SYSTEM

BACKGROUND OF THE INVENTION

The present invention relates to a method for transmitting at least one first and one second data signal in polarization division multiplex in an optical transmission system which includes a transmitting arrangement and a receiving arrangement which are connected to one another via at least one optical fiber link section.

In optical transmission systems, the transmission capacity of existing optical transmission systems can be extended by transmitting the optical data signals in polarization division multiplex. To transmit optical data signals in polarization division multiplex, in each case two carrier signals which are respectively modulated with a data signal are generated in at least one transmitting arrangement with the same wavelength. The first and second modulated signals exhibit a mutually orthogonal polarization. The mutually orthogonally polarized modulated signals are combined to form an optical polarization division multiplex signal. The optical polarization division multiplex signal is injected into the optical transmission fiber and transmitted via the optical transmission link to a receiving unit. At the receiving end, the two orthogonally polarized modulated signals are recovered from the polarization division multiplex signal in a wavelength-dependent and polarization-dependent manner.

One of the essential problems in transmitting optical data signals in polarization division multiplex is the recovery of the two orthogonally polarized modulated signals from the polarization division multiplex signal.

This requires the determination of a control criterion for controlling a polarization transformer arranged at the receiving end from the transmitted optical polarization division multiplex signal. The modulated signals transmitted polarized orthogonally with respect to one another are separated with the aid of the polarization transformer controlled via the suitable control criterion and, for example, a downstream polarization splitter or a polarization filter.

Different control criteria are known for controlling the separation of the two orthogonally polarized signals at the receiving end. From the publication "optical polarization division multiplexing at 4GB/S" by Paul M. Hill et al., IEEE Photonics Technology Letters, Vol. 4, No. 5, May 1992, the use of coherent techniques in combination with pilot tones for reconstructing or, respectively, separating the polarization division multiplexed optical signals is known. Furthermore, separating the polarization division multiplexed optical data signals via a correlation signal generated from the recovered clock and from the received optical signals is known from the publication "Fast Automatic Polarization Control System", Heismann and Whalen, IEEE Photonics Technology Letters, Vol. 4, No. 5, May 1992.

Moreover, a method for separating the two signals transmitted orthogonally polarized at the receiving end via the evaluation of the autocorrelation function of one of the signals transmitted is known from international application WO 01/65754 A1. In this arrangement, the control of the polarization control element at the receiving end is determined with the aid of the extinction ratio of the respective transmitted signal, calculated via the autocorrelation amount.

An object of the present invention is to devise a novel method and optical transmission system for transmitting high-bit-rate optical signals in polarization division multiplex.

SUMMARY OF THE INVENTION

A key advantage of the method according to the present invention can be seen in the fact that to transmit at least one first and one second data signal in polarization division multiplex in an optical transmission system, in a first step, a first modulated signal is generated at the transmitting end by modulating a first carrier signal with the first data signal and a second modulated signal is generated by modulating a second carrier signal, which differs from the first carrier signal by a differential frequency, with the second data signal. In a second step, the first and second modulated signals are polarized orthogonally with respect to one another and combined to form an optical multiplex signal and are transmitted. In a third step, at the receiving end, the optical multiplex signal is conducted via a polarization control element to a polarization splitter which splits the optical multiplex signal into the first and second modulated signal. In a fourth step, the first modulated signal is converted into a first electrical signal and the second modulated signal is converted into a second electrical signal. In a fifth step, the spectral component of the first and/or of the second electrical signal at the differential frequency is determined and from this at least one control signal is derived for controlling the polarization control element. Using the method according to the present invention, at least one polarization control element arranged at the receiving end is controlled particularly advantageously for the precise separation of a first and second modulated signal transmitted in polarization division multiplex at the receiving end. For this purpose, the squaring characteristic of an optoelectrical transducer, such as a photodiode, is used. Due to these squaring characteristics, unwanted spectral components arise at the differential frequency in the electrical spectrum of the electrical signal output at the output of the optoelectrical transducer if the separation of the two modulated signals transmitted in polarization division multiplex, performed with the aid of the polarization splitter, is not precise. These spectral components located at the differential frequency arise both in the first electrical signal and in the second electrical signal. According to the present invention, the amplitude of these spectral components is evaluated for forming at least one control signal for controlling the polarization control element. During this process, the polarization control element is controlled, such as with the aid of the at least one control signal, in such a manner that the spectral component arising at the differential frequency becomes minimal. Such a severe control criterion makes it possible to separate the two modulated signals transmitted in polarization division multiplex as precisely as possible at the receiving end.

The first or second modulated signal is advantageously delayed at the transmitting end which results in effective decorrelation of the first and second modulated signal. This makes it possible, additionally, to increase the severity of the control criterion.

A further advantage of the present invention can be seen in the fact that, to distinguish between the first and second electrical signal, at least one pilot tone signal is superimposed on the first and/or the second carrier signal at the transmitting end. Advantageously, a pilot tone having a specified frequency, with the aid of which, after the first and second modulated signal have been separated with the aid of the polarization splitter and converted into a first and second electrical signal at the transmitting end, an unambiguous identification of the first and second electrical signal as such becomes possible, is superimposed on the first and/or second modulated signal. As an alternative, the first and second data signal can be transmitted with different transmission bit rate for distinguishing the first and second electrical signal. In an alternative embodiment, the respective electrical signal is advantageously identified via its current transmission bit rate.

Additional features and advantages of the present invention are described in, and will be apparent from, the following Detailed Description of the Invention and the Figures.

DETAILED DESCRIPTION OF THE INVENTION

Figure 1:
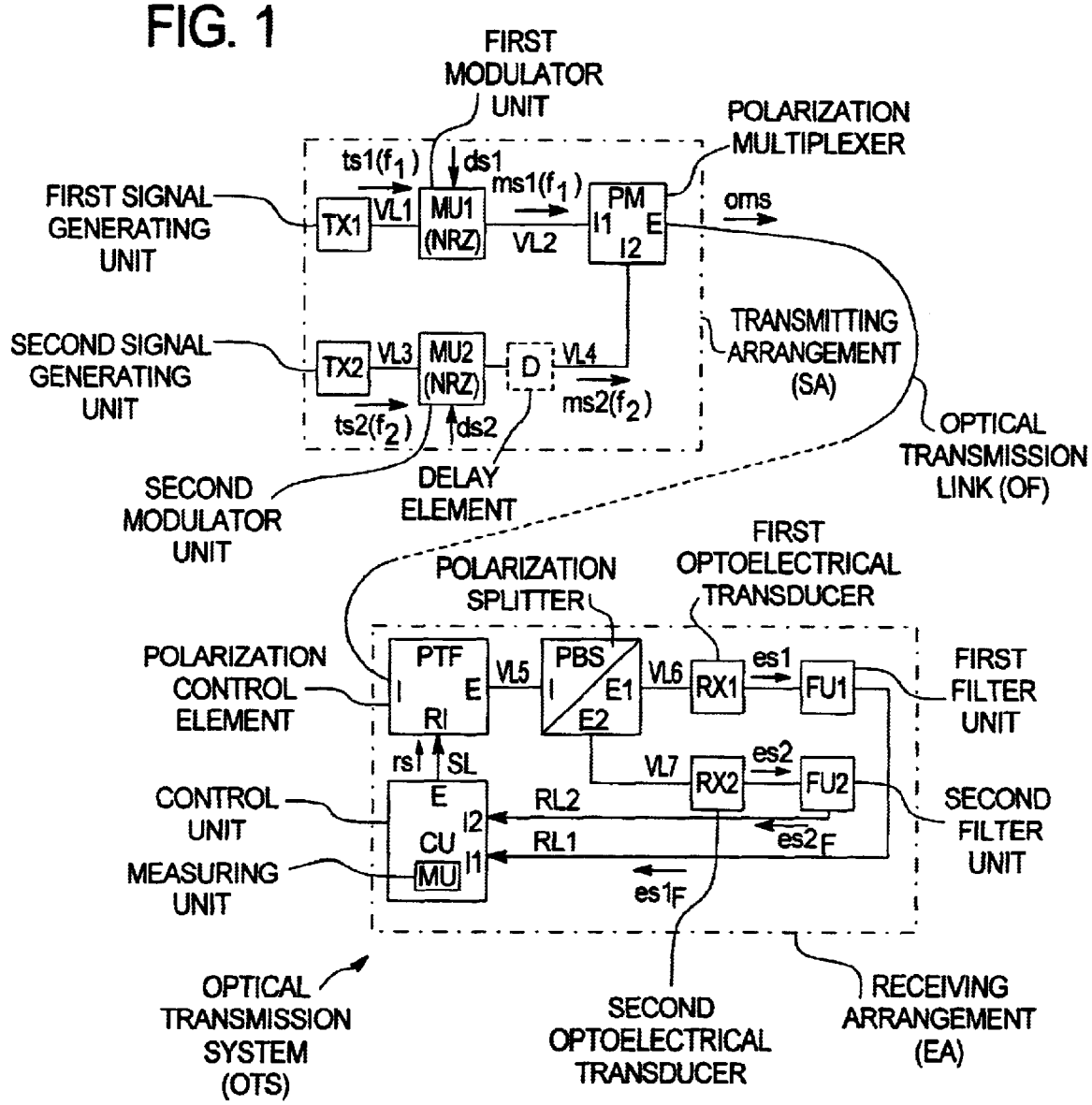
FIG. 1 shows, by way of example, an optical transmission system for transmitting at least one first and one second data signal in polarization division multiplex.

FIG. 1 diagrammatically shows, by way of example, an optical transmission system OTS which exhibits a transmitting arrangement SA and a receiving arrangement EA connected via an optical transmission link OF. In the transmitting arrangement SA, a first and second signal generating unit TX1, TX2, a first and second modulator unit MU1, MU2, a delay element D and a polarization multiplexer PM are provided by way of example. The receiving arrangement EA includes a polarization control element PTF, a polarization splitter PBS, a first and second optoelectrical transducer RX1, RX2, a first and second filter unit FU1, FU2 and a control unit CU.

The first signal generating unit TX1 of the transmitting arrangement SA is connected via a first connecting line VL1 to the first modulator unit MU1 which is connected to the first input I1 of the polarization multiplexer PM via a second connecting line VL2. The second signal generating unit TX2 is connected via a third connecting line VL3 to the second modulator unit MU2 which is connected via a delay element D to the second input E2 of the polarization multiplexer PM by a fourth connecting line VL4. The delay element D is only provided optionally which is shown by a dashed line in FIG. 1.

The input of the optical transmission link OF, the output of which is conducted to the input I of the polarization control element PTF of the receiving arrangement EA, is connected to the output E of the polarization multiplexer PM. The optical transmission link OF can consist of a number of optical transmission link sections not shown in FIG. 1 (indicated by a dashed line in FIG. 1).

The output E of the polarization control element PTF is connected via a fifth connecting line VL5 to the input I of the polarization splitter PBS, the first output E1 of which is conducted to the input of the first optoelectrical transducer RX1 via a sixth connecting line VL6 and the second output E2 of which is conducted to the input of the second optoelectrical transducer RX2 via a seventh connecting line VL7. The outputs of the first and second optoelectrical transducers RX1, RX2 are conducted to the inputs of the first and second filter units FU1, FU2, respectively. The first filter unit FU1 and the second filter unit FU2 are connected, for example, via a first and a second control line RL1, RL2, respectively, to the first and second input I1, I2, respectively, of the control unit CU, the output E of which is connected to the control input RI of the polarization control element PTF via a control line SL. In addition, the control unit CU includes, for example, a measuring unit MU.

In the first signal generating unit TX1, a first carrier signal ts1 with a first frequency $f_1$ is generated which is conducted from the first signal generating unit TX1 to the first modulator unit MU1 via the first connecting line VL1. In addition, a first data signal ds1 is conducted to the first modulator unit MU1, via which data signal the first carrier signal ts1 (f1) is modulated and, as a result, a first modulated signal ms (f1) is generated which is directed via the second connecting line VL2 to the first input I1 of the polarization multiplexer PM.

In the second signal generating unit TX2, a second carrier signal ts2 with a second frequency $f_2$ is generated, the first frequency $f_1$ of the first carrier signal ts1($f_1$) differing from the second frequency $f_2$ of the second carrier signal ts2($f_2$) by a differential frequency $\Delta f$. The differential frequency $\Delta f$ selected is a value of greater than one gigahertz ($\Delta f=5$ GHz in the exemplary embodiment considered). The second carrier signal ts2($f_2$) thus exhibits a second frequency $f_2$ which is increased by the amount of the differential frequency $\Delta f$ in comparison with the first carrier signal ts1($f_1$). The second carrier signal ts2($f_2$) is supplied to the second modulator unit MU2 via the third connecting line VL3. The second modulator unit MU2 is also supplied with a second data signal ds2 for further processing.

In the second modulator unit MU2, the second carrier signal ts2($f_2$) is modulated with the second data signal ds2 and, as a result, a second modulated signal ms2($f_2$) is generated which is directed to the second input I2 of the polarization multiplexer PM via the delay element D and the fourth connecting line VL4. In this arrangement, the second modulated signal ms2($f_2$) output at the output of the second modulator unit MU2 is delayed with the aid of the delay element D, as a result of which the first and second modulated signal ms1($f_1$), ms2($f_2$) can be decorrelated at the transmitting end.

During the generation of the first and second modulated signal ms1(f1), ms2(f2), the polarization is set in such a manner that these are polarized orthogonally to one another and, thus, can be transmitted in polarization division multiplex via the optical transmission link OF to the receiving arrangement EA. To orthogonalize the polarization of the first and second modulated signals ms1 (f1), ms2(f2), polarization control elements (not shown in FIG. 1) can be provided; for example, at the receiving end. However, this is not mandatorily required, especially since optical signals with a predetermined polarization already can be generated with the aid of modern signal generating unit TX1, TX2.

The first and second modulated signals ms1($f_1$), ms2($f_2$) are combined with the aid of the polarization multiplexer PM to form an optical multiplex signal oms which is injected into the optical transmission link OF at the output E of the polarization multiplexer PM. Thus, the first and second modulated signals ms1($f_1$), ms2($f_2$) are transmitted in polarization division multiplex in the form of the optical multiplex signal oms via the optical transmission link OF.

In the receiving arrangement EA, the optical multiplex signal oms is conducted to the input I of the polarization control element PTF with the aid of which the polarization of the transmitted first and/or second modulated signal ms1($f_1$), ms2($f_2$) can be controlled within the optical multiplex signal oms. After the polarization of the transmitted first and/or second modulated signal ms1($f_1$), ms2($f_2$) has been set within the optical multiplex signal oms, the optical multiplex signal oms is conducted via the fifth connecting line VL5 to the input I of the polarization splitter PBS which splits the optical multiplex signal oms into the first modulated signal ms1($f_1$) and the second modulated signal ms2 ($f_2$). The accuracy with which the optical multiplex signal oms is split into the first modulated signal ms1($f_1$) and the second modulated signal ms2($f_2$) depends on the orthogonality of the polarization of the first modulated signal ms1($f_1$) and the second modulated signal ms2($f_2$).

The first modulated signal ms1($f_1$) is output at the first output E1 of the polarization splitter PSB and conducted to the first optoelectrical transducer RX1 via the sixth connecting line VL6. Analogously, the second modulated signal ms2($f_2$) is output at the second output E2 of the polarization splitter PBS and transmitted to the second optoelectrical transducer RX2 via the seventh connecting line VL7.

The recovered first and second modulated signals ms1 (f1), ms2(f2) are converted by the first and second optoelectrical transducers RX1, RX2, respectively, into a first and second electrical signal es1, es2, respectively, which are conducted to the first and second filter units FU1, FU2, respectively. Due to the squaring characteristics of the first and second optoelectrical transducers RX1, RX2, a spectral component is generated at the differential frequency $\Delta f$. Using the first and second filter unit FU1, FU2, this spectral component of the first and of the second electrical signals es1, es2 at the differential frequency $\Delta f$ is determined and the filtered first and second electrical signal $es1_F$, $es2_F$ are transmitted via the first and second control lines RL1, RL2 to the control unit CU. For this purpose, the first and second filter units FU1, FU2 are designed, for example, as a band-pass filter with a center frequency $f_M$ corresponding to the differential frequency $\Delta f$ ($f_M$=5 GHz, for example, in the exemplary embodiment considered) and a bandwidth of, for example, 1 GHz around the differential frequency $\Delta f$.

Using the measuring unit MU, the amplitude of the filtered first and/or of the second electrical signal $es1_F$, $es2_F$ is determined in the control unit CU, and from this at least one control signal rs is derived for controlling the polarization control element PTF which signal is conducted to the control input RI of the polarization control element PTF via the control line SL. To form the control signal rs, for example, the voltage amplitude or the current amplitude or the power amplitude of the filtered first and/or of the second electrical signal $es1_F$, $es2_F$ can be measured and evaluated. During this process, the polarization of the optical multiplex signal oms is changed by the polarization control element PTF controlled by the control signal rs, in such a manner that the amplitude of the filtered first and/or of the second electrical signal $es1_F$, $es2_F$, determined by the measuring unit MU of the control unit CU, becomes minimal and, thus, the spectral component of the first and/or second electrical signal es1, es2 at the receiving end also assumes a minimum. As such, the receiving arrangement EA consisting of the polarization control element PTF and the polarization splitter PBS is optimally set for separating the first modulated signal ms1(f1) and the second modulated signal ms2(f2) and, thus, the spectral components of the first and second electrical signals es1, es2, arising at the differential frequency $\Delta f$ due to the squaring characteristics of the first and second optoelectrical transducers RX1, RX2, exhibit a minimum or, respectively, are no longer measurable. Thus, a precise separation of the first and second modulated signals ms1($f_1$), ms2($f_2$), transmitted in a mutually orthogonally polarized manner, becomes possible at the receiving end via the arrangement shown in FIG. 1.

Figure 2:
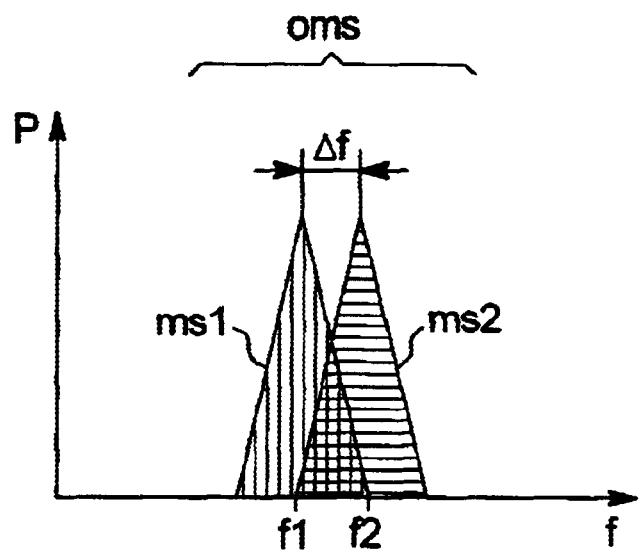
FIG. 2 shows, by way of example, the optical multiplex signal.

In FIG. 2, the power distribution of the first and second modulated signal ms1($f_1$), ms2($f_2$) within the optical multiplex signal oms is plotted against frequency f, by way of an example, in a diagram. The frequency f is plotted along the abscissa of the diagram and the power p is plotted along the ordinate of the diagram. FIG. 2 shows the differential frequency $\Delta f$ between the first frequency $f_1$ of the first modulated signal ms1(f1) and the second frequency f2 of the second modulated signal ms2(f2). The power distribution shown in FIG. 2 thus corresponds to he optical multiplex signal oms output by the polarization multiplexer PM at the output E to the optical transmission link OF.

Figure 3:
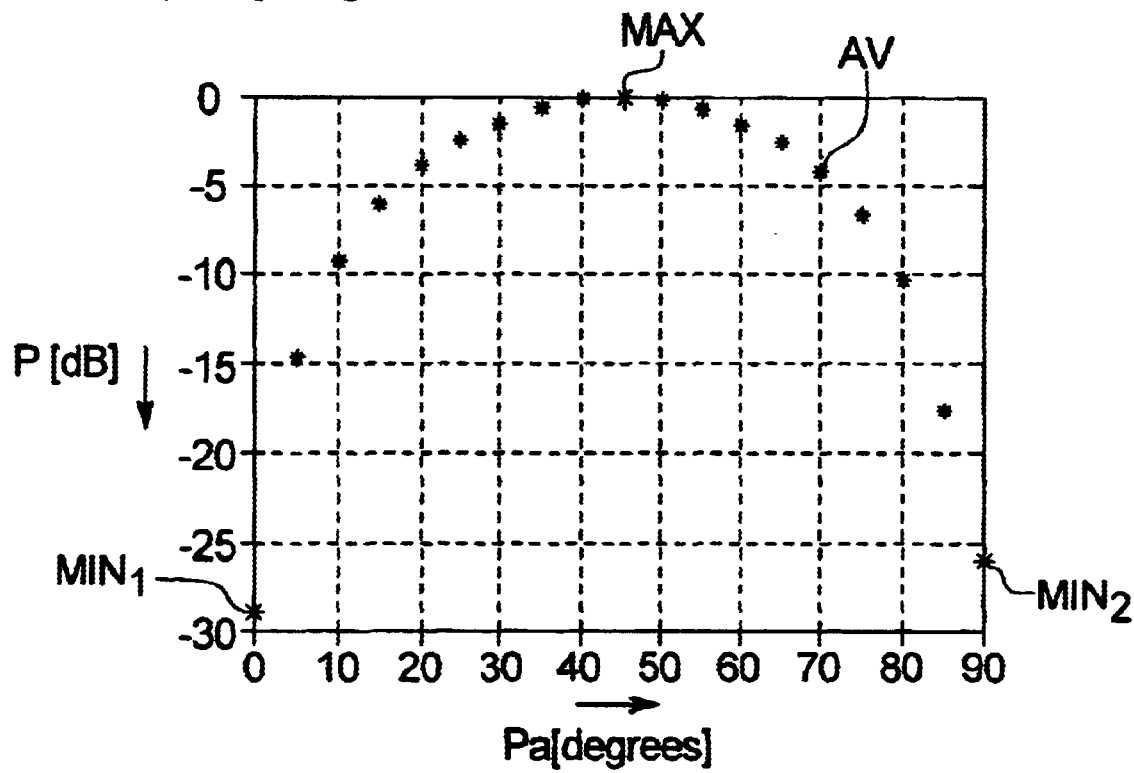
FIG. 3 shows the amplitude variation of the spectral component determined at the differential frequency in dependence on the polarization angle.

FIG. 3 shows the amplitude variation AV in a logarithmic scale [dB] of the spectral component determined, for example of the power amplitude of the filtered first and/or electrical signal $es1_F$, $es2_F$, at the differential frequency $\Delta f$ in dependence on the polarization angle pa in a diagram. The polarization angle pa is plotted along the abscissa of the diagram and the amplitude P is plotted along the ordinate. The amplitude variation AV exhibits a maximum max AT a polarization angle of pa=45°; i.e., the spectral component caused at the differential frequency $\Delta f$ due to the squaring characteristic of the first and/or second optoelectrical transducer RX1, RX2 exhibits a maximum MAX with a polarization shift of 45° between the first and second electrical signal es1, es2. This maximum MAX of the spectral component at the differential frequency $\Delta f$ decreases both with increasing and with decreasing polarization shift between the first and second electrical signal es1, es2 and reaches a first minimum $MIN_1$ at 0° and a second minimum $MIN_2$ at 90°. At the first and second minimum $MIN_1$, $MIN_2$, the first and second modulated signal ms1, ms2 transmitted within the optical modulation signal oms are ideally polarized orthogonally and, thus can be separated almost perfectly with the aid of the polarization splitter PBS. When the first minimum $MIN_1$ occurs at a polarization angle of pa=0°, the modulated signal of one polarization, such as the first modulated signal ms1, is perfectly detected and when the second minimum $MIN_2$ occurs at a polarization angle of pa 90°, the modulated signal of the other polarization, such as the second modulated signal ms2, is perfectly detected. All other polarization angles pa are unwanted in the control and lead to crosstalk during the separation of the first and second modulated signals ms1, ms2.

Due to the delay, such as of the second modulated signal ms2, performed with the aid of the delay element D optionally provided in the transmitting arrangement SA, the control criterion shown in FIG. 3 becomes even more diverse, as a result of which an even more severe control signal rs can be formed in the control unit CU. For this purpose, a delay element D can be used for optionally delaying the first or the second modulated signal ms1, ms2.

In addition, both the first and the second filtered electrical signals $es1_F$, $es2_F$ can be evaluated for forming at least one control signal rs.

Moreover, additional filtering of the first and second electrical signals es1, es2 at other frequencies apart from the differential frequency $\Delta f$ is possible with the aid of the first and second filter units FU1, FU2 or other filter units in order to obtain further information about the polarization of the first and second electrical signal es1, es2. This further information then can be processed further in order to increase the diversity of the at least one control signal rs.

To distinguish between the first and second electrical signals es1, es2 separated with the aid of the polarization splitter PBS at the receiving end, the first and second data signals ds1, ds2 can be transmitted at different transmission bit rates or, alternatively, at least one pilot tone signal can be superimposed on the first and/or the second carrier signal ts1, ts2 or the first and second modulated signals ms1, ms2 at the transmitting end. In this process, the first and second electrical signals es1, es2 are identified as such either by the determination at the receiving end of the transmission bit rate of the respective electrical signal es1, es2 or by the identification of the pilot tone signal at the receiving end, and then can be processed further in a signal-related way.

Although the present invention has been described with reference to specific embodiments, those of skill in the art will recognise that changes may be made thereto without departing from the spirit and scope of the present invention as set forth in the hereafter appended claims.

What is claimed is:

1. A method for transmitting at least one first and one second data signal in polarization division multiplex in an optical transmission system, the method comprising the steps of:

generating a first modulated signal at a transmitting end by modulating a first carrier signal with the first data signal;

generating a second modulated signal by modulating a second carrier signal, which differs from the first carrier signal by a differential frequency, with the second data signal;

polarizing the first and second modulated signals orthogonally with respect to one another;

combining the polarized signals to form an optical multiplex signal;

transmitting the optical multiplex signal;

conducting the optical multiplex signal at a receiving end, via a polarization control element to a polarization splitter;

splitting the optical multiplex signal, via the polarization splitter, into the first and second modulated signals;

converting the first modulated signal into a first electrical signal;

converting the second modulated signal into a second electrical signal;

determining a spectral component of at least one of the first and the second electrical signals at the differential frequency; and deriving from the spectral component at least one control signal for controlling the polarization control element.

2. A method for transmitting at least one first and one second data signal as claimed in claim 1, wherein an amplitude of at least one of the first and second electrical signals, at the differential frequency, is controlled to a minimum.

3. A method for transmitting at least one first and one second data signal as claimed in claim 1, wherein at least one of the first and the second modulated signals is delayed at the transmitting end for purposes of decorrelation.

4. A method for transmitting at least one first and one second data signal as claimed in one of claim 1, wherein a value of greater than one gigahertz is selected as the differential frequency.

5. A method for transmitting at least one first and one second data signal as claimed in claim 1, the method further comprising the step of superimposing at least one pilot tone signal on at least one of the first and the second modulated signals at the transmitting end in order to distinguish between the first and second electrical signals.

6. A method for transmitting at least one first and one second data signal as claimed in claim 1, wherein the first and second data signals are transmitted at different transmission bit rates for distinguishing between the first and second electrical signals.

7. An optical transmission system for transmitting at least one first and one second data signal in polarization division multiplex, comprising:

a transmitting arrangement including at least one signal generating unit for generating a first and a second carrier signal, differing by a differential frequency, at least one modulator unit following the generating unit for generating a first modulated signal by modulating the first carrier signal with the first data signal and for generating a second modulated signal by modulating the second carrier signal with the second data signal, the first and second modulated signals being polarized orthogonally with respect to one another, and a polarization multiplexer following the modulator unit for combining the first and second modulated and mutually orthogonally polarized signals to form an optical multiplex signal;

a receiving arrangement connected to the transmitting arrangement via at least one optical fiber link section, the receiving arrangement including at least one polarization control element for adjusting the orthogonality of the polarization of the first and second modulated signals, a polarization splitter following the polarization control element, having first and second outputs for splitting the optical multiplex signal into the first and second modulated signals, a first optoelectrical transducer connected at the first output for converting the first modulated signal into a first electrical signal, and a second optoelectrical transducer at the second output for converting the second modulated signal into a second electrical signal;

a filter unit provided at at least one of the first and the second optoelectrical transducers for determining a spectral component of at least one of the first and the second electrical signals at the differential frequency; and a control unit connected to the filter unit for forming at least one control signal from the filtered spectral component for controlling the polarization control element.

8. An optical transmission system for transmitting at least one first and one second data signal as claimed in claim 7, further comprising, for forming the at least one control signal, a measuring unit in the control unit for determining an amplitude of the filtered spectral component of at least one of the first and the second electrical signals.

9. An optical transmission system for transmitting at least one first and one second data signal as claimed in claim 7, wherein the filter unit is a band-pass filter with a center frequency corresponding to the differential frequency.

10. An optical transmission system for transmitting at least one first and one second data signal as claimed in claim 7, further comprising other filter units at at least one of the first and the second optoelectrical transducers for determining further spectral components of at least one of the first and the second electrical signals at different frequencies which are additionally evaluated for forming the at least one control signal in the control unit.

* * * * *